United States Patent
Park et al.

(10) Patent No.: US 10,112,255 B2
(45) Date of Patent: Oct. 30, 2018

(54) PLATE BONDING METHOD AND PLATE ASSEMBLY

(71) Applicant: KOREA INSTITUTE OF ENERGY RESEARCH, Daejeon (KR)

(72) Inventors: Jong-Soo Park, Daejeon (KR); Kyung-Ran Hwang, Daejeon (KR); Dong-Wook Lee, Daejeon (KR); Ju-Seok Park, Daejeon (KR); Chun-Boo Lee, Daejeon (KR); Sung-Wook Lee, Daejeon (KR); Duck-Kyu Oh, Daejeon (KR); Jin-Woo Park, Daejeon (KR); Min-Ho Jin, Daejeon (KR)

(73) Assignee: Korea Institute of Energy Research (KR)

( * ) Notice: Subject to any disclaimer, the term of this patent is extended or adjusted under 35 U.S.C. 154(b) by 0 days.

(21) Appl. No.: 15/319,256

(22) PCT Filed: Jun. 17, 2015

(86) PCT No.: PCT/KR2015/006146
§ 371 (c)(1),
(2) Date: Dec. 15, 2016

(87) PCT Pub. No.: WO2015/194861
PCT Pub. Date: Dec. 23, 2015

(65) Prior Publication Data
US 2017/0129047 A1    May 11, 2017

(30) Foreign Application Priority Data
Jun. 17, 2014  (KR) .................. 10-2014-0073726

(51) Int. Cl.
*B23K 20/00*  (2006.01)
*B23K 20/02*  (2006.01)
(Continued)

(52) U.S. Cl.
CPC ............ *B23K 20/026* (2013.01); *B23K 20/24* (2013.01); *B24C 1/10* (2013.01); *B23K 2201/18* (2013.01); *B23K 2201/35* (2015.10)

(58) Field of Classification Search
CPC ....................................... B23K 20/02
(Continued)

(56) References Cited

U.S. PATENT DOCUMENTS 3,647,606 A  *  3/1972  Notaro ................... B29C 70/24
                                                    428/184
5,312,503 A     5/1994  Yuki
(Continued)

FOREIGN PATENT DOCUMENTS

JP    2006-334638 A    12/2006
JP    2010-094683 A    4/2010
(Continued)

OTHER PUBLICATIONS

English computer translation of JP2006-334638A.*
English Translation of International Search Report from PCT/KR2015/006146; dated Sep. 10, 2015.

*Primary Examiner* — Erin B Saad
(74) *Attorney, Agent, or Firm* — Baker & Hostetler LLP

(57) ABSTRACT

The present invention relates to a thin plate bonding method or a thin plate assembly, and more particularly, to a thin plate bonding method which includes coating with a coating material after increasing a surface roughness or increasing a surface roughness through coating with a coating material, and then, conducting diffusion bonding, such that excellent bonding strength is achieved even when the diffusion bonding is performed at low temperature and low pressure, thin plate deformation by thermal stress may be prevented, and high air tightness may be obtained since the coating material fills micro-pores.

5 Claims, 5 Drawing Sheets

(51) Int. Cl.
  *B23K 20/24*  (2006.01)
  *B24C 1/10*  (2006.01)
  *B23K 101/18*  (2006.01)
  *B23K 101/34*  (2006.01)

(58) Field of Classification Search
  USPC ................................ 228/194, 101, 164, 193
  See application file for complete search history.

(56) References Cited

U.S. PATENT DOCUMENTS

| | | | | |
|---|---|---|---|---|
| 5,498,484 | A * | 3/1996 | Duderstadt | C23C 4/02 |
| | | | | 148/240 |
| 5,714,202 | A * | 2/1998 | Lemelson | C23C 4/02 |
| | | | | 427/124 |
| 5,866,252 | A * | 2/1999 | de Rochemont | C23C 16/408 |
| | | | | 257/E39.018 |
| 6,440,575 | B1 * | 8/2002 | Heimberg | C23C 28/00 |
| | | | | 428/469 |
| 6,521,108 | B1 * | 2/2003 | Zhang | B23K 35/002 |
| | | | | 204/298.12 |
| 6,793,968 | B1 * | 9/2004 | Reymann | C23C 4/18 |
| | | | | 118/719 |
| 7,282,274 | B2 * | 10/2007 | Millard | B32B 15/02 |
| | | | | 428/545 |
| 2010/0247949 | A1 * | 9/2010 | VanDyke | B23K 20/021 |
| | | | | 428/615 |

FOREIGN PATENT DOCUMENTS

| | | |
|---|---|---|
| KR | 10-1990-0003921 | 3/1990 |
| KR | 10-1992-0010232 B1 | 11/1992 |
| KR | 10-1999-0051624 | 7/1999 |
| KR | 10-2001-0075630 A | 8/2001 |
| KR | 10-0505534 B1 | 8/2005 |
| KR | 10-0719484 B1 | 5/2007 |
| KR | 10-0719486 B1 | 5/2007 |
| KR | 10-2008-0108171 A | 12/2008 |

* cited by examiner

PLATE BONDING METHOD AND PLATE ASSEMBLY

CROSS-REFERENCE TO RELATED APPLICATIONS

This application is a National Stage of International Patent Application No. PCT/KR2015/006146, filed Jun. 17, 2015 and claims priority to foreign application KR 10-2014-0073726, filed Jun. 17, 2014, the contents of which are incorporated herein by reference in their entirety.

TECHNICAL FIELD

The present invention relates to a thin metal plate bonding method and a thin plate assembly, and more particularly, to a bonding method including coating with a coating material after increasing a surface roughness, or coating with a microfine material to increase the surface roughness, so as to ensure air tightness while having excellent bonding strength even when conducting diffusion bonding at low temperature and low pressure, as well as a thin plate assembly resulting from the same.

BACKGROUND ART

A thin metal plate bonding method generally includes welding, soldering and diffusion bonding processes according to types of the thin metal plates to be bonded.

The welding process includes partially melting a bonding part of metal, then solidifying the same to complete the bonding, while the soldering process uses a bonding material having a lower melting point than a thin metal plate to be bonded, wherein the molten bonding material is evenly infiltrated into a gap between the thin metal plates to be bonded through a capillary phenomenon to bond the same. These two bonding processes are very simple and commercially used in a wide range of applications. However, such techniques could not be used for entirely bonding the interface of a plate to be bonded, hence not assuring air tightness between channels formed inside the plate. Therefore, the above processes cannot be employed as a bonding method for a micro-channel reactor (hereinafter referred to as an MCR), which is configured by thin plate assembly technique.

Meanwhile, the diffusion bonding is a bonding method that varies some parameters such as temperature, pressure, time, etc. in order to generate diffusion between different materials and bonds the same. When using this method, it is advantageously possible to bond not only the thin metal plate but also a thin plate of a non-metal material. When bonding thin plates with being stacked up such as a heat exchanger or micro-channel heater (Korean Patent Registration No. 10-0719484), the bonding can be completed throughout a contact interface between the thin plates to thus attain air tightness between channels. Therefore, it is possible to form a reactor using the above bonding technique.

However, since the conventional diffusion bonding method is performed at high temperature and high pressure, and in a case in which a thin plate to be bonded has a micro-channel made of the same material as of a catalyst, like an MCR apparatus disclosed in Korean Patent Registration No. 10-0719486, there are problems that the catalyst is damaged due to degradation during bonding, and a shape of the micro-channel was changed. Further, there is another problem that micro-pores are present in the bonded thin plate assembly to cause a decrease in air tightness, for example, inter-connection between channels, leakage to an outside, etc.

In regard to the above-described problems, a technical field of a heat exchanger or reactor will be additionally described, for example. The technique of the heat exchanger or reactor using the thin plate may enable scaling-up by repeatedly laminating the same form of thin plates by turns, therefore, being an applicable field that has a configuration involving excellent mass-productivity and a great possibility of further development. The repeatedly laminated configuration of the heat exchanger may be formed by stacking up thin plates in turns, wherein each of the thin plates has microfine grooves processed on the surface thereof through which a fluid can flow, as shown in FIGS. 1 and 2.

The gist of the above configuration is that, when the number of alternately laminated thin plates is increased to several hundreds, the number of bonded interfaces is also increased to several hundreds. Even if only one of the plates has a pore in any position of A, B, C shown in FIG. 2 to cause a leakage of fluid in arrow directions, two different fluids A and B are mixed with each other, otherwise, a fluid C may be discharged to the outside. As a result, the heat exchanger may loss the function of a heat exchanger. The leakage to the outside C may be supplemented by determining a site of the pore using a gas detector, then welding a part around the pore site, however, if there are pores formed inside the areas A and B, it is not possible to supplement the same by, for example, a locally welding process. Accordingly, suppression of pores is the most difficult problem in the present technical field. A cause of pore generation may be avoided by conducting the bonding at a high temperature. However, in such a configuration that a functional component such as a catalyst or separator is included in the heat exchanger, these components have a low heat-resistant temperature and may be lost by degradation during high-temperature bonding, hence causing a problem. For these reasons, there is still a difficulty in manufacturing products although the above method can be utilized in diverse industrial applications and have some advantages.

In order to overcome the conventional problems described above, in addition to establishment of basic requirements such as a desired bonding strength and minimum change of appearance, diffusion bonding should be executed at low temperature and low pressure to prevent degradation of internal components during bonding, and even when the bonding process is conducted under conditions of low temperature and low pressure, high air tightness must be ensured.

PRIOR ART DOCUMENT

Patent Document

[Patent Document 1] Korean Patent Registration No. 10-0505534

[Patent Document 2] Korean Patent Laid-Open Publication No. 10-1999-0051624 (published on Jul. 5, 1999)

[Patent Document 3] Korean Patent Laid-Open Publication No. 10-1990-0003921 (published on Mar. 27, 1990)

DISCLOSURE

Technical Problem

In order to solve the above problems, an object of the present invention is to provide a thin plate bonding method that is able to conduct diffusion bonding even at low temperature and low pressure, and can remove micro-pores inherently present on the surface of the thin plate or formed in a process of increasing surface roughness. According to the above method, a low temperature bonded product having air tightness may be provided while achieving a desired bonding strength.

Technical Solution

In order to achieve the above-described objects, according to an aspect of the present invention, there is provided a thin plate bonding method through lamination and bonding of two or more thin plates, including: a roughness increasing process of increasing a surface roughness of at least one of surfaces of two or more thin plates facing each other; a coating process of coating the above surface with metal or ceramic; and a diffusion bonding process of laminating the two or more thin plates, then bonding the said thin plates under heated and pressurized conditions.

Herein, the roughness increasing process may be a blasting or peening process of colliding micro-particles with the surface.

In addition, the micro-particles may be made of the same material as that of the thin plate.

Further, the blasting process may be wet blasting or dry blasting.

Furthermore, the roughness increasing process may be a peening process of colliding shot with the surface.

According to another aspect of the present invention, there is provided a thin plate bonding method through lamination and bonding of two or more thin plates, including: a roughness increasing process of applying a metal or ceramic to at least one of surfaces of two or more thin plates facing each other to coat the surface, thereby increasing a surface roughness of the coated surface; and a diffusion bonding process of laminating the two or more thin plates, then bonding the said thin plates under heated and pressurized conditions.

Herein, the metal may be a microfine metal

In addition, the ceramic may have a column form.

Further, in another aspect of the present invention, there is provided a thin plate assembly fabricated according to the above thin plate bonding method. Such a thin plate assembly may include, for example, an MCR device, separator module, heat exchanger, or the like.

Advantageous Effects

According to the present invention, diffusion bonding may be possible at low temperature and low pressure. In addition, the bonded thin plate assembly may have an excellent bonding strength. Further, since the bonding is executed at a low temperature, deformation of a thin plate due to thermal stress may be prevented. Furthermore, the coating material may be filled into micro-pores on the surface of a metal plate to thus provide a thin plate assembly having high air tightness. Accordingly, the inventive thin plate bonding method may be employed in an MCR device including a catalyst and/or a low heat-resistant material such as a hydrogen separating complex membrane.

BEST MODE

Figure 1:
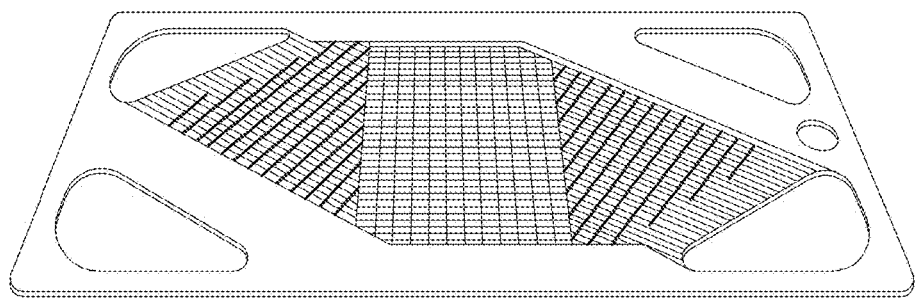
FIGS. 1 and 2 are photographs showing an inner surface of a plate for fabricating a heat exchanger through alternate lamination.
Figure 2:
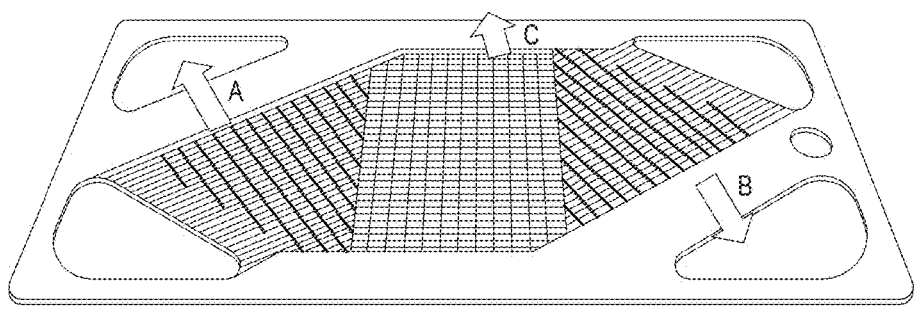

Hereinafter, the present invention will be described with reference to the accompanying drawings in detail. Herein, the publicly known functions and configurations that are judged to be able to make the purport of the present invention unnecessarily obscure will not be described.

Diffusion bonding is a bonding method which includes closely contacting subject materials to be bonded together; and applying a pressure to the materials in a level of not causing plastic deformation while heating the same at a temperature of not more than a melting point of the materials, thus utilizing diffusion of atoms generated between the bonding surfaces. In general, the bonding surface for diffusion bonding is subjected to pre-treatment such as grinding, to thus have a flatten surface having greatly decreased surface roughness (see Korean Patent Laid-Open Publication No. 10-1999-0051624).

However, a first embodiment of the present invention may perform diffusion bonding under conditions of low temperature and low pressure after processing to increase the roughness ('roughness increasing process') and coating in order.

The roughness increasing process is a process of increasing the roughness of at least one of the surfaces of adjacent thin plates facing each other, in order to increase local compression during diffusion bonding. That is, this method means that the bonding surface of a thin plate having a smooth and flat surface is processed by any physical or chemical method to forcedly increase the surface roughness of the bonding surface, but it is not particularly limited to those mentioned herein. Further, such a roughness increasing process may be executed on either or both surfaces of the adjacent thin plates facing each other, and in particular, when executing the roughness increasing process on both surfaces, the roughness increasing process should be conducted at positions in which these surfaces correspond to each other. Due to the roughness increasing process, it is possible to conduct blasting that injects micro-particles toward to the surface of the thin plate and allows the same to come into collision. The micro-particles used herein may include, for example, sand, steel crushed pieces, sand particles, silica particles, or the like. In this regard, in order to prevent the micro-particles remaining on the thin plate from acting as impurities in the bonding, the micro-particles may be possibly made of the same material as that of the thin plate. The blasting may include wet blasting to inject water along with the micro-particles, and dry blasting to inject compressed air along with the micro-particles. Further, a peening process of colliding shot with the surface of the thin plate may also be adopted as the roughness increasing process. In this case, the shot may include metal balls or fine particles (grits) having a sharp blade formed by crushing the metal balls into pieces. Such blasting micro-particles and shot as described above may have a particle size in a range of 0.1 to 100 μm. Further, with regard to the blasting or peening process of colliding micro-particles with the surface, the micro-particle may be made of the same material as that of the thin plate. This is for purpose of keeping uniformity of the bonded thin plate assembly. Further, after the blasting or peening process, a washing process may further be performed to remove any residue.

A rough face formed by the roughness increasing process may locally receive extremely high pressure to enable diffusion bonding of the configurative plate under conditions of low temperature and low pressure. That is, a protrusion of the rough face may play a role of a bonding active center.

Since a pressure may be locally concentrated during bonding due to the roughness increasing process, diffusion bonding may be advantageously conducted even at a low temperature. However, a depth of grooves formed on the surface of the thin plate may also be increased in a process of increasing an average roughness. Accordingly, such deep grooves may be risky to act as a cause of leaking a fluid. That is, during accomplishing the low temperature bonding, another negative factor may also occur. Therefore, in order to complete the low temperature bonding, it is necessary to develop a plan for decreasing the bonding temperature on the premise of ensuring air tightness. For this purpose, coating a bonding interface with a microfine metal or ceramic material may minimize a junction area, thus leading to low temperature bonding. Further, melting the coating material may induce a function of pore removal.

The coating process is to further apply metal or ceramic to either or both surfaces of the thin plate facing each other, after the roughness increasing process but before the bonding. A coating material used herein may include divalent, trivalent or tetravalent metal, and the ceramic may include zirconium oxide or inorganic mixtures. The coating may be performed under vacuum or a non-activated atmosphere such as Ar, N2, He, etc.

Preferably, the metal or ceramic may be a microfine metal or a microfine ceramic having a column form, respectively. When the coating material has a constant level of size or a spherical form, a melting point may be raised to hence inhibit the coating material from expressing original functions thereof. As the melting point of the coating material is decreased, the coating material may fully function as a cross-linking agent to allow diffusion bonding even under conditions of low temperature and low pressure. Further, even under conditions of low temperature and low pressure, the coating material may be molten and infiltrated into pores, thereby efficiently eliminating the pores. More preferably, the microfine metal and the microfine ceramic of a column form need to have a diameter of not more than 10 μm. However, this is only an illustrative numerical value, and may be changed depending upon types of metals and ceramics. Therefore, the scope of the present invention is not particularly limited to the above definition. In a case of coating through typical electrolytic welding, non-electrolytic welding, etc., the coating may be performed in a size of several tens micrometers, thus not achieving the purpose of the present invention. Therefore, when performing microfine material coating, sputtering is preferably used. When using a sputtering process, the coating may be easily performed with a column diameter in a range of 0.05 to 1 μm. However, the coating method is not particularly limited to the sputtering, and may include any one of conventional methods without particular limitation thereof, so far as those can achieve the purpose of coating described above.

According to the present invention, when the surface roughness of either or both surfaces of the thin plates facing each other before diffusion bonding is increased, then, coating is executed by applying a coating material to either or both surfaces of the thin plates facing each other, a thin plate assembly having excellent bonding strength may be fabricated even when the diffusion bonding proceeds under conditions of low temperature and low pressure. Further, since the diffusion bonding is executed under conditions of low temperature and low pressure, deformation of the configurative plate may be considerably reduced. Further, since the molten coating material may be infiltrated into the pores inherently present in either or both surfaces of the thin plates and the pore formed in the roughness increasing process to fill the same, then, solidified, a density of the thin plate assembly may be increased.

A second embodiment of the present invention may include, after coating at least one or both surfaces of adjacent thin plates facing each other with metal or ceramic, and conducting a roughness increasing process to increase a surface roughness, then heating the thin plates under a pressure, thereby completing the diffusion bonding. Unlike the first embodiment, the surface coating process after the roughness increasing process is omitted in this embodiment.

Like the first embodiment, the coating material used for increasing the roughness may include divalent, trivalent and/or tetravalent metals, while the ceramic may include zirconium oxide or an inorganic mixture. The coating may be performed under vacuum or a non-activated atmosphere such as Ar, N2, He, etc. Further, like the first embodiment, the metal or ceramic is preferably a microfine metal or a microfine ceramic having a column form, respectively. More preferably, the microfine metal and the microfine ceramic of a column form need to have a diameter of not more than 10 μm. A difference from the first embodiment is that the coating material is applied to a subject at a constant interval in a constant depth and desired patterns, in order to increase surface roughness of the thin film. That is, roughness increasing effects and coating effects according to the first embodiment may be simultaneously exhibited. Accordingly, even if the diffusion bonding proceeds under conditions of low temperature and low pressure, a thin plate assembly having excellent bonding strength may be fabricated. Further, since the diffusion bonding is conducted under conditions of low temperature and low pressure, deformation of the configurative plate may be minimized. Furthermore, the molten coating material may be infiltrated into the pores inherently present in either or both surfaces of the thin plates and the pores formed in the roughness increasing process to fill the same, then, solidified, thereby increasing a density of the thin plate assembly.

Therefore, similar to the MCR device disclosed in Korean Patent Laid-Open Publication No. 10-0719486, the inventive method may be used for a method for fabricating a thin plate assembly that has a lamination construction of several thin plates laminated, and includes a device having micro-channels made of the same material as a catalyst. Such problems that the catalyst gets damaged due to degradation and a shape of micro-channel is changed, may be solved by the diffusion bonding at low temperature and low pressure. Further, it is possible to prevent a reduction in efficiency or loss of function caused by leaking a reaction gas out of a reactor due to micro-pores in the bonded thin plate assembly or by an occurrence of mixing up different materials through inter-connection between the channels. Further, not only when a channel or catalyst is formed on the thin plate, but also when a specific structure and chemical material artificially designed for specific purposes are included, the inventive method may be generally employed. In this regard, in a case in which a part artificially formed by any physical or chemical method and having specific use and function such as the part having the micro-channel formed therein, it is preferable that such a processing of increasing the roughness, coating with a coating material and/or coating with a coating material, then increasing the roughness, does not proceed. The reason is that, there is a risk of modifying the artificially formed structure or physical properties.

Hereinafter, the principle and effects of the present invention will be described in more details with reference to the following experimental example.

Experimental Example

1. First Step: Roughness Increasing Process

Figure 3:
FIGS. 3 and 4 are photographs showing a thin metal plate and the surface condition thereof before blasting.
Figure 4:
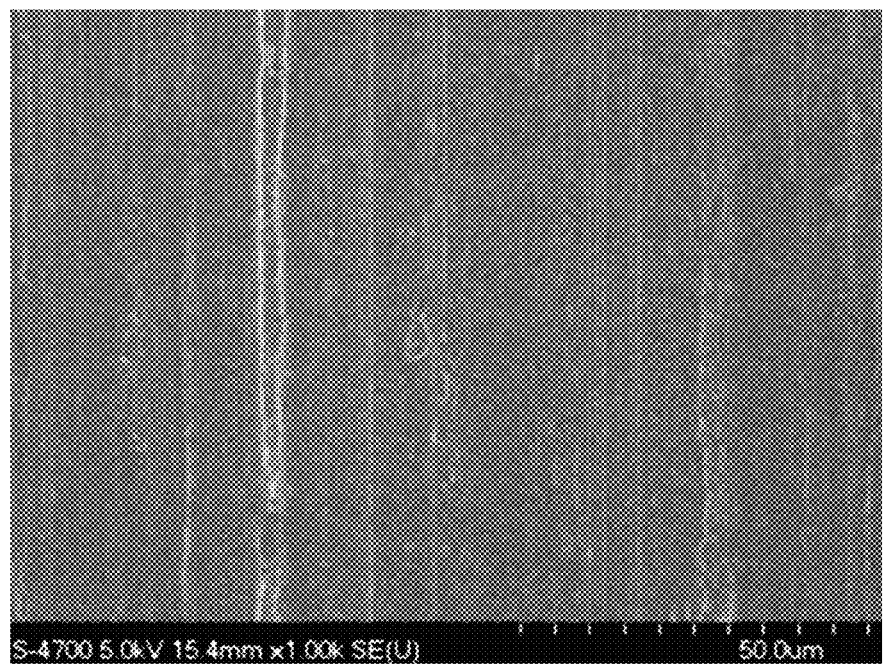
Figure 5:
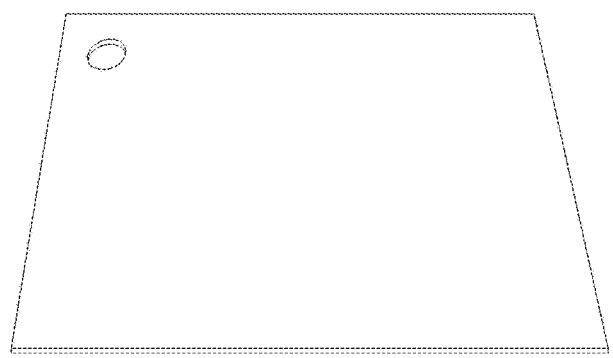
FIGS. 5 and 6 are photographs showing a thin metal plate and the surface condition thereof after blasting.
Figure 6:
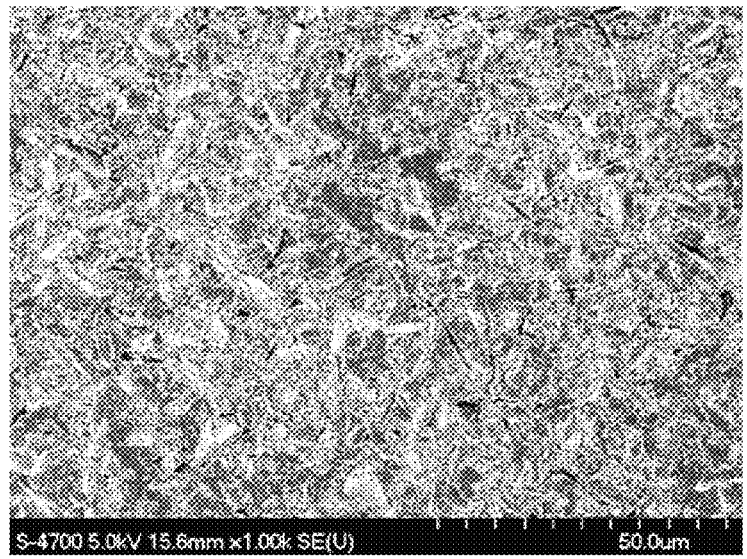

A stainless steel 316L material having an average roughness (Ra) of 0.071 μm and a maximum roughness (Rz) of 1.115 μm (see FIGS. 3 and 4) was subjected to blasting, thus increasing a surface roughness to achieve an average roughness (Ra) of 0.360 μm and a maximum roughness (Rz) of 3.007 μm (see FIGS. 5 and 6). Appearances of the thin plate before and after processing may be seen in the drawings. The drawings illustrated that an initial mother material had reflective properties similar to a mirror, however, surface reflective properties had disappeared after roughness increasing. It was already described that such a progress is an approach as opposed to typical diffusion bonding processes.

2. Second Step: Coating Process

To the surface of a specimen having increased surface roughness obtained after the blasting process, nickel was applied using a sputtering device, thus forming a 1μm thickness coating.

Figure 7:
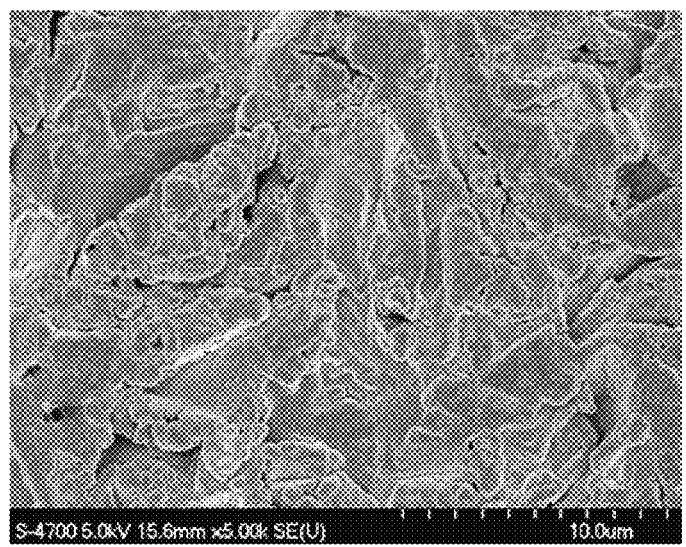
FIGS. 7 and 8 are photographs showing the surface condition of a thin metal plate processed by blasting the thin metal plate, then coating the surface of the blasted plate with a microfine metal.
Figure 8:
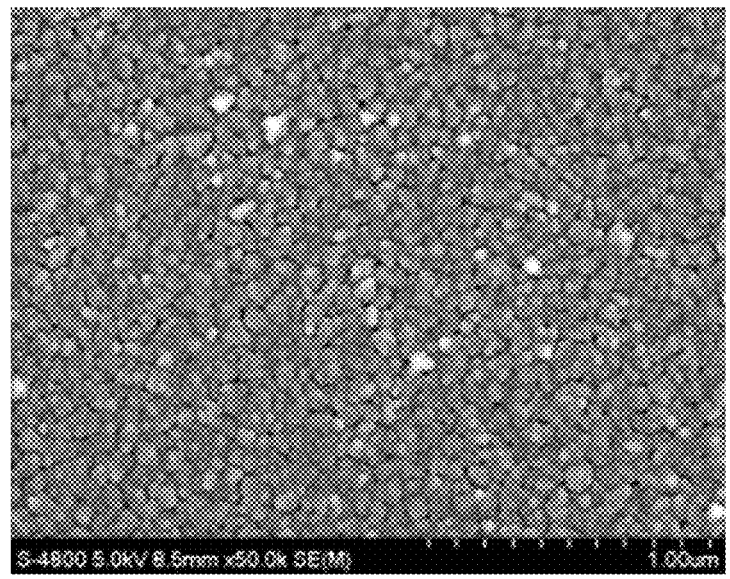

As shown in FIGS. 7 and 8, it may be seen that the surface was uniformly coated with columns having an average diameter of 100 nm.

3. Third Step: Diffusion Bonding Process

In order to identify effects of the thin plate assembly according to the present invention, following three cases were presumed: the experimental example was performed by the above experimental procedures, that is, after blasting two surfaces of two thin plates facing each other, the processed surfaces were subjected to nickel coating and diffusion bonding under conditions of low temperature and low pressure; in Comparative Example 1, two thin plates were subjected to diffusion bonding under conditions of low temperature and low pressure without blasting; and, in order to compare the experimental example with the conventional high temperature diffusion bonding method, Comparative Example 2 was performed by diffusion bonding two thin plates under conditions of high temperature and high pressure without blasting. The experimental example and Comparative Example 1 proceeded with the bonding under conditions of 400° C. and a pressure of 10 ton/cm$^2$ for 4 hours, while Comparative Example 2 conducted the bonding under conditions of 1000° C. and a pressure of 10 ton/cm$^2$ for 4 hours.

Result of Experiment

Figure 9:
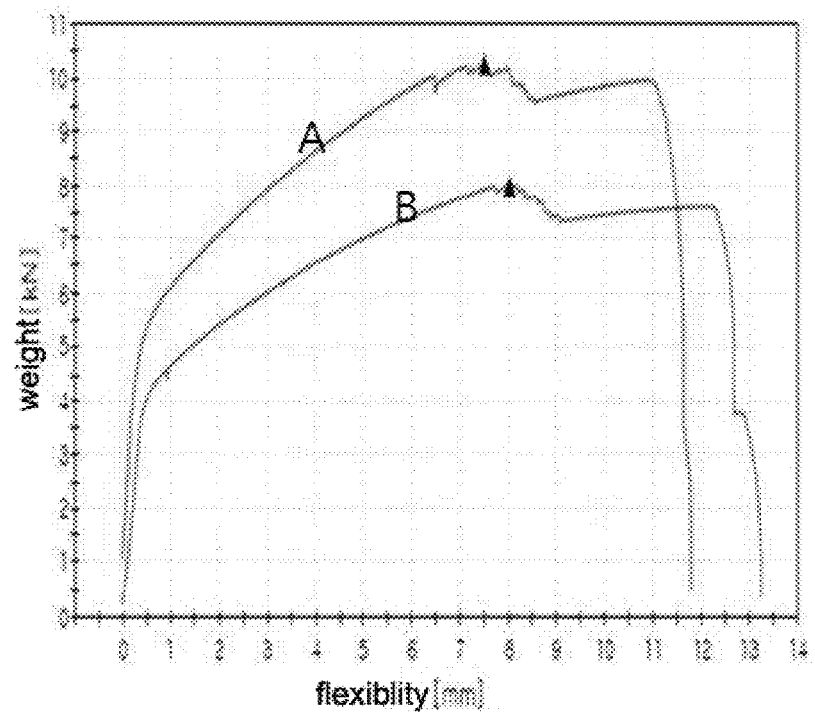
FIG. 9 is a graph illustrating measured results of bending strengths in an experimental example and comparative examples.

FIG. 9 is a graph illustrating the measured results of bending strengths in the experimental example and Comparative Example 2. In Comparative Example 1, the thin plate has never done adhesion. Both of the experimental example and comparative example 2 have succeeded the bonding. A curve A showed result values of the experimental example while a curve B showed result values of Comparative Example 1. The experimental example (curve A) gained a maximum load of 10.2 kN (a maximum tensile strength of 289 MPa) and a maximum drawing of 11.8 mm, while Comparative Example 2 (curve B) showed a maximum load of 7.9 kN (a maximum tensile strength of 279 MPa) and a maximum drawing of 13.2 mm. Accordingly, it may be confirmed that the bonding method of the present invention has more excellent maximum tensile strength and less strain than the existing high temperature and high pressure bonding techniques, even when the present inventive method is executed under conditions of low temperature and low pressure.

Figure 10:
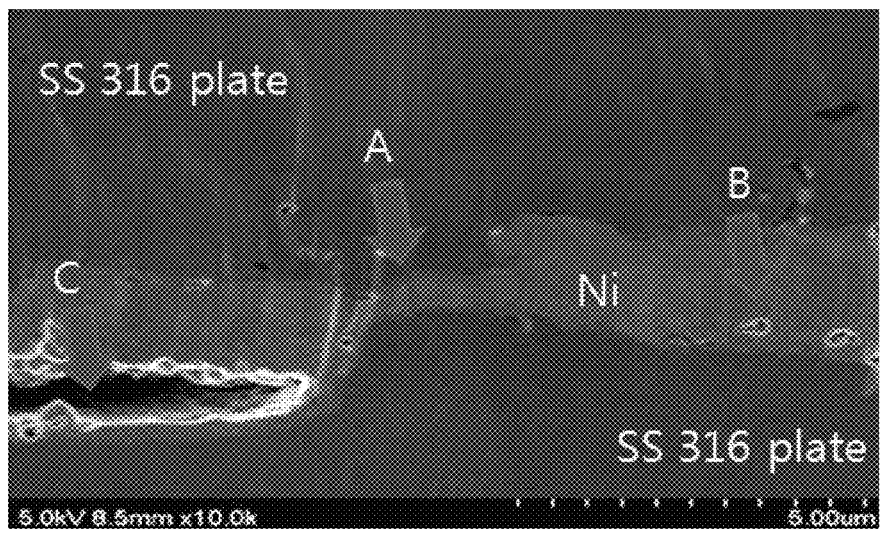
FIGS. 10 and 11 are photographs showing analyzed results of the bonded interface.

FIG. 10 is a photograph showing the bonding interface after cutting the thin plate assembly according to the present invention. A part A in which outmost points of upper and lower configurative plates contact with each other was formed of a thinner layer than a coating thickness of nickel micro-particles. On the other hand, the coating material was concentrated by 2 or 3 times a thickness of the coated subject around a large hole part B, to thus fill the pore. That is, the microfine coating material may fill a large pore generated during blasting and facilitate securing desired air tightness. It may be seen that, although all of pores were not completely removed (see a part C), the microfine coating material fully carried out a role of isolating the pores to prevent these pores from inter-connecting and becoming a channel for flowing a fluid to the outside.

Figure 11:
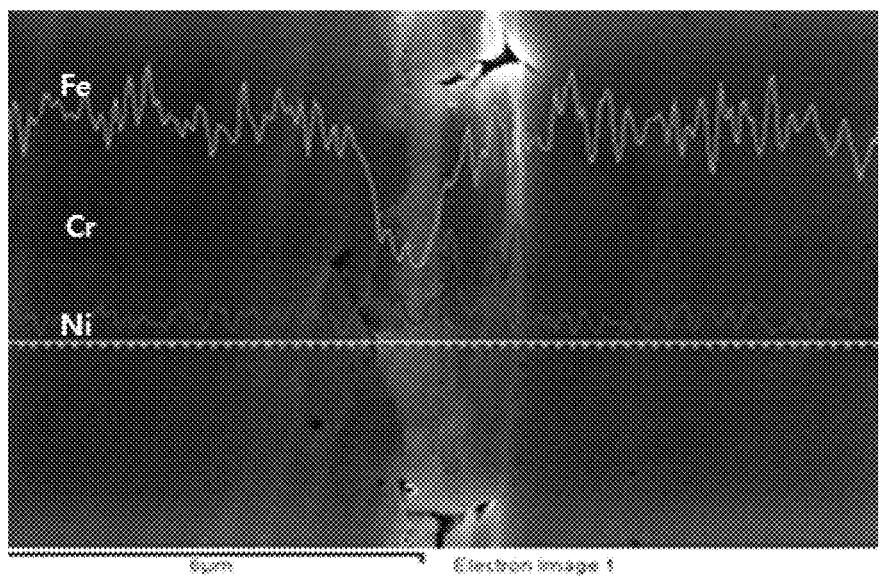

FIG. 11 is a photograph showing the bonding interface after cutting the thin plate assembly according to the present invention and a graph illustrating contents of components (Cr, Fe) in the thin plate and a coating material (Ni). It may be seen that the coating material was microfine nickel and partially diffused into the surface of the thin plate while the components of the thin plate were also under inter-diffusion into the coating layer, so as to proceed the bonding.

While the present invention has been described with reference to the preferred embodiments, it will be understood by those skilled in the related art that various modifications and variations may be made therein without departing from the scope of the present invention as defined by the appended claims.

The invention claimed is:

1. A plate bonding method through lamination and bonding of two or more plates, comprising:
   a roughness increasing process of increasing a surface roughness of at least one surface of the two or more plates facing each other;
   a coating process of uniformly coating microfine ceramic columns on the at least one surface of the two or more plates, wherein the microfine ceramic columns have a diameter of not more than 10 microns; and
   a diffusion bonding process of laminating the two or more plates, then bonding the plates under heated and pressurized conditions.

2. The method according to claim 1, wherein the roughness increasing process is a blasting process of colliding micro-particles toward the at least one surface of the two or more plates.

3. The method according to claim 2, wherein the micro-particles are made of the same material as that of the two or more plates.

4. The method according to claim 2, wherein the blasting process is wet blasting or dry blasting.

5. The method according to claim 1, wherein the roughness increasing process is a peening process of colliding shot toward the at least one surface of the two or more plates.

* * * * *